US010303466B1

(12) United States Patent
Karman et al.

(10) Patent No.: US 10,303,466 B1
(45) Date of Patent: May 28, 2019

(54) SEMANTIC ANNOTATIONS IN SOURCE CODE

(71) Applicant: Amazon Technologies, Inc., Seattle, WA (US)

(72) Inventors: Alexander Francis Karman, Annandale, VA (US); Christian-Damien Jowel Laguerre, Silver Spring, MD (US); Michael Foley, National Harbor, MD (US); Alexander Scott Boyce, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 15/258,958

(22) Filed: Sep. 7, 2016

(51) Int. Cl.
 *G06F 9/44* (2018.01)
 *G06F 17/27* (2006.01)
 *G06F 8/73* (2018.01)
 *G06F 8/41* (2018.01)
 *G06F 11/36* (2006.01)

(52) U.S. Cl.
 CPC .............. *G06F 8/73* (2013.01); *G06F 8/436* (2013.01); *G06F 11/3612* (2013.01); *G06F 11/3644* (2013.01); *G06F 9/44* (2013.01); *G06F 17/2785* (2013.01)

(58) Field of Classification Search
 CPC ........... G06F 8/73; G06F 9/44; G06F 17/2785
 See application file for complete search history.

(56) References Cited

U.S. PATENT DOCUMENTS

| 2008/0114937 | A1* | 5/2008 | Reid ..................... G06F 11/362 711/117 |
| 2008/0235661 | A1* | 9/2008 | Arpana .................... G06F 8/24 717/116 |
| 2012/0102456 | A1* | 4/2012 | Paulheim .................. G06F 8/73 717/116 |

(Continued)

OTHER PUBLICATIONS

Oliveira et al. Semantic Annotation Tools Survey, 7 pages (Year: 2013).*

(Continued)

*Primary Examiner* — Lewis A Bullock, Jr.
*Assistant Examiner* — Tina Huynh
(74) *Attorney, Agent, or Firm* — Thorpe North & Western, LLP.

(57) ABSTRACT

A technology is described for embedding a semantic annotation in operation code. An example method may include creating an executable package file that includes operation code obtained from a source executable package file. The operation code may be analyzed to identify a program element included in the operation code that is associated with a semantic annotation. The semantic annotation may then be inserted into the operation code relative to the program element associated with the semantic annotation. The executable package file may be executed, launching a program, and the semantic annotation may be evaluated during execution of the program to retrieve semantic context obtained from the ontological data referenced by the semantic annotation. The semantic context may be processed, causing execution behavior of the program to be analyzed in relation to the program element included in the operation code.

20 Claims, 10 Drawing Sheets

(56) References Cited

U.S. PATENT DOCUMENTS

| | | | |
|---|---|---|---|
| 2014/0189668 A1* | 7/2014 | Balasubramanian | G06F 8/36 717/163 |
| 2014/0229917 A1* | 8/2014 | Chiantera | G06F 11/3684 717/124 |
| 2016/0191295 A1* | 6/2016 | Dong | H04L 41/024 707/741 |

OTHER PUBLICATIONS

Liao et al., Why, Where and How to use Semantic Annotation for Systems Interoperability, 9 pages (Year: 2011).*

LePendu et al., Ontology Database A New Method for Semantic Modeling and an Application to Brainwave Data, 18 pages (Year: 2008).*

Simon et al., An Ontological Document Management System, 13 pages (Year: 2007).*

* cited by examiner

US 10,303,466 B1

SEMANTIC ANNOTATIONS IN SOURCE CODE

BACKGROUND

The semantic web provides a common framework that allows semantic data to be shared and reused across applications, enterprises, and community boundaries. The semantic web can be described as a web of data, such as dates, titles, part numbers, chemical properties, and any other conceivable semantic data that can be published and linked so that the data is available to anyone wanting to access it. The technical standards commonly used with the semantic web include: RDF (Resource Description Framework), which is a data modeling language for the semantic web used to store and represent semantic information; SPARQL (SPARQL Protocol and RDF Query Language), which is an RDF query language designed to query data across various systems; and OWL (Web Ontology Language), which is a schema language or knowledge representation language used to define concepts that can be reused.

Ontologies (also called vocabularies) are building blocks for inference techniques used on the semantic web. Ontologies are used to define concepts and relationships that describe and represent an area of concern that may be provided through the semantic web. Ontologies are used to classify terms which can be used in a particular application, characterize possible relationships, and define possible constraints on using the terms. In practice, ontologies can be very complex (e.g., with several thousands of terms) or very simple (e.g., describing just one or two concepts).

DETAILED DESCRIPTION

A technology is described for embedding semantic annotations into operation code and for enabling a program to access semantic context obtained from an ontology during execution of the operation code. A semantic annotation may be linked to ontological data that provides semantic context describing a semantic concept associated with operation code. For example, a semantic annotation may include a URI (Uniform Resource Identifier) that references ontological data. The ontological data may be constructed using a Resource Description Framework (RDF) format (e.g., RDF triples) and may be made publicly available to various entities.

In one example, semantic annotations may be inserted into operation code using an insertion process that adds functionality to a program by modifying the operation code of the program. As used herein, operation code may refer to any program language code that can be modified to include semantic annotations. For example, operation code may include high level language code (e.g., text), intermediate machine interpreted code (e.g., bytecode), and compiled computer code. In one example, an operation code editor may be used to add a semantic annotation to the operation code of a program. An operation code editor may enable modification of operation code, including third-party operation code. An operation code editor may be associated with a particular programming language. For example, Javassist (JAVA programming assistant) is an intermediate operation code editor used to modify JAVA bytecode (program JAVA operation code) included in a class file at the time the class file is loaded by a Java Virtual Machine (JVM).

A semantic annotation embedded in operation code for a program may be placed in a file or in a storage location in relation to an operation code component, such as a class, method, variable, or parameter. For example, a semantic annotation may be inserted above a class or method declaration in a class file, object file, or other file type that includes intermediate operation code. The semantic annotation may link to the ontological data that provides semantic context for the operation code component. The semantic context provided by the ontological data may be used to evaluate or analyze execution behavior of the program at runtime, as well as to modify the execution behavior at runtime using reflection. Programs configured to use reflection may have the ability to examine, introspect, and modify the structure and behavior of the program using semantic context obtained via a semantic annotation while the program is executing.

Figure 1:
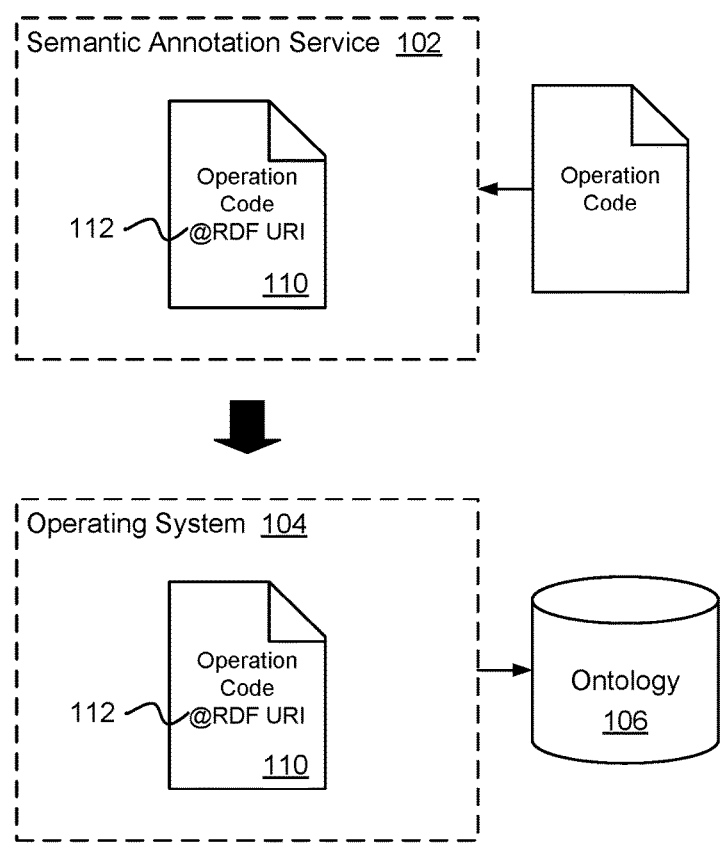
FIG. 1 is a diagram illustrating an example of embedding a semantic annotation into operation code of a program enabling semantic context to be retrieved from an ontology during execution of the program.

FIG. 1 is a diagram illustrating a high level example of embedding a semantic annotation 112 into the operation code 110 of a program that enables semantic context to be retrieved from an ontology 106 during execution of the program. A semantic annotation 112 may be a form of an annotation that includes one or more semantic URIs, RDF (Resource Description Framework) triples, and/or semantic metadata that can be added to programming operation code. Examples of programming languages that may be annotated with semantic annotations may include, but are not limited to: JAVA, C#, Erlang, Factor, Haxe, Scala, Common Lisp, as well as C and C++ using attributes with the compilers GCC and CLANG. For example, a semantic annotation 112 can be placed in operation code 110 so that the semantic annotation 112 is associated with a class, method, variable, parameter, or some other operation code component.

During execution of a program, a semantic annotation 112 may be evaluated and semantic context obtained from an ontology 106 may be used to examine or analyze the execution behavior of the program. For example, in evaluating a semantic annotation 112 associated with a particular method, a semantic context for the method may be obtained from an ontology 106 and the semantic context may be provided to a user, thereby providing the user with context information about the execution behavior of the method. As a specific example, a semantic annotation 112 may be associated with an exception handler and evaluation of the semantic annotation 112 during execution of the program may provide a user with semantic context for the exception, such as a detailed meaning of the exception, knowledge base information that can be used to remedy the exception, customer support cases that are related to the exception, as well as other information.

Moreover, during execution of a program, a semantic annotation 112 may be evaluated and semantic context obtained from an ontology 106 may be used to modify the execution behavior of the program. For example, evaluating a semantic annotation 112 associated with a particular class may result in obtaining semantic context for the class from an ontology 106 that includes instructions to change the structure of the program (e.g., replace the class with a different class), resulting in changing the execution behavior of the program using reflection. Reflection may refer to the ability of a program to examine, introspect, and modify the program's own structure and behavior at runtime. As a specific example, evaluation of a semantic annotation 112 associated with a class during execution of a program may cause semantic context to be obtained from an ontology 106 that instructs the program to incorporate and execute an additional class that may not have been included in an original executable package file.

As illustrated, a semantic annotation service 102 may be used to embed one or more semantic annotations 112 into the operation code 110 of a program. In one example, operation code 110 may be submitted to the semantic annotation service 102, which may be configured to analyze the operation code 110 and identify program components (e.g., classes, methods, variables, parameters, etc.) included in the operation code 110 that may be associated with semantic annotations 112 and the semantic annotation service 102 may prepare to insert the semantic annotation 112 into the operation code 110 to maintain the identified association. For example, a semantic annotation 112 may be mapped to a particular program component and the semantic annotation service 102 may be configured to parse the operation code 110 and identify the program component that the semantic annotation 112 is mapped to. As an illustration, a semantic annotation 112 may be mapped to "class MyClass { }". Thus, the operation code 110 may be parsed to identify the "class MyClass { }".

After analyzing the operation code 110 for the program and identifying program components mapped to semantic annotations 112, the semantic annotation service 102 may be configured to insert the semantic annotations 112 into the operation code 110 relative to the program components associated with the semantic annotations 112, thereby linking the program components to a semantic context that can be obtained from an ontology 106 containing ontological data associated with the program components during execution of program. As an illustration, a semantic annotation 112 mapped to "class MyClass { }" may be inserted in the operation code 110 above the class declaration for "class MyClass { }". Illustratively, after inserting the semantic annotation 112 into operation code, the operation code may resemble:

@RDF URI
class MyClass {
// field, constructor, and
// method declarations
}

A semantic annotation 112 embedded in the operation code 110 of a program may be evaluated during execution of the program. For example, loading the operation code 110 into computer memory by an operating system 104 and executing the operation code 110 using a virtual machine (e.g., a Java virtual machine (JVM)) executing on a hardware processor may result in evaluating the semantic annotation 112 in association with executing a program component associated with the semantic annotation 112. Processing of the semantic annotation 112 during execution of the program may retrieve a semantic context obtained from an ontology 106 referenced by the semantic annotation 112. In one example, evaluation of a semantic annotation 112 that includes a URI or RDF triple may cause a query to be generated that retrieves semantic context from ontology data included in an ontology 106. For example, evaluating a URI or a RDF triple included in a semantic annotation 112 during execution of a program may cause a SPARQL query to be generated that retrieves ontological data from an ontology 106. Semantic context may be derived from the ontological data and the semantic context may be used to examine, and perhaps modify, the execution behavior of a program as described above.

Figure 2:
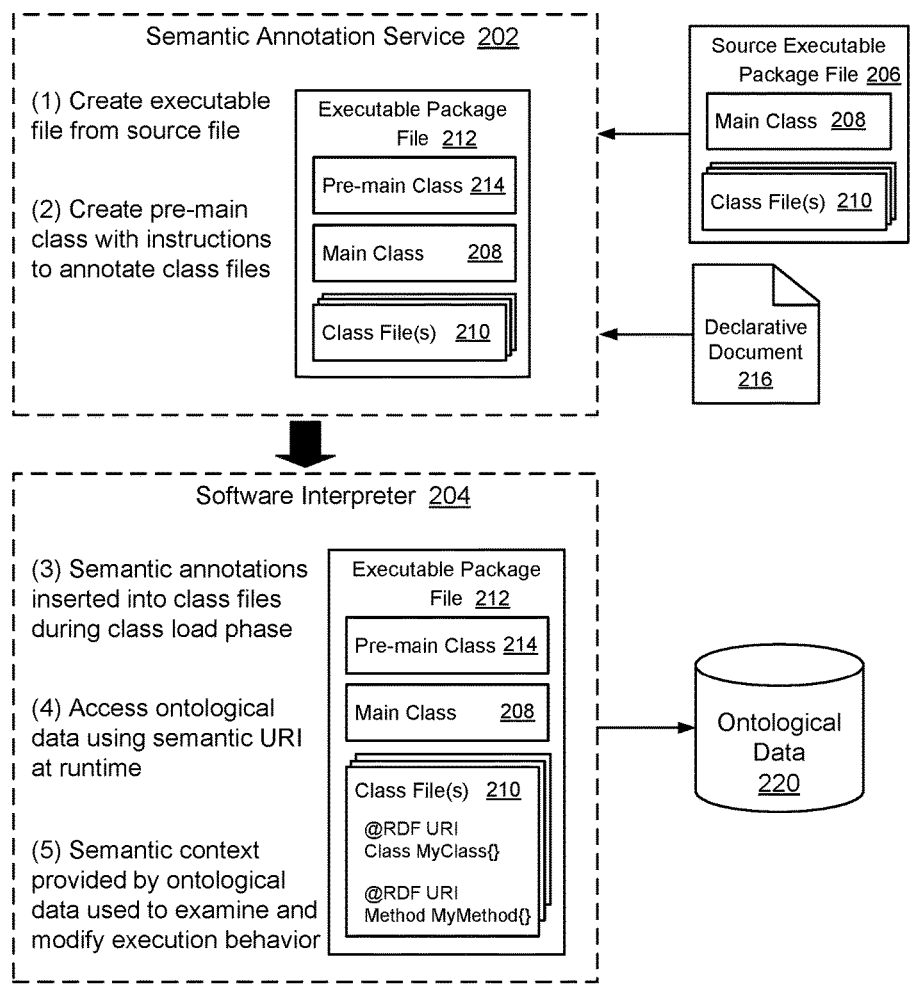
FIG. 2 is a diagram that illustrates an example method for embedding semantic annotations into a class file included in an executable package file.

FIG. 2 is a diagram that illustrates one example method for embedding semantic annotations into a class file 210 included in an executable package file 212. An executable package file 206, 212 may include one or more program components used to execute a program. One example of an executable package file 206, 212 may include a JAVA JAR (Java Archive) file, which is a package file format that aggregates multiple JAVA class files and associated metadata and resources (text, images, etc.) into a single file that can be distributed as application software or libraries on a JAVA platform. JAVA WAR (Web ARchive) and EAR (Enterprise ARchive) are also examples of executable package files 206. Another example of an executable package file 206, 212 may include a MSIL (MICROSOFT intermediate language) file, which is a processor independent set of instructions that can be converted to compiled code that is compatible with an operating system. As used herein, a class file may refer to any file type that includes operation code that can be annotated with semantic annotations.

In the example illustrated in FIG. 2, a semantic annotation service 202 may be configured to modify an executable package file 212 enabling one or more semantic annotations to be embedded into class files 210 included in the executable package file 212 at execution time. The semantic annotation service 202 may be configured to create an executable package file 212 using components obtained from a source executable package file 206. For example, the source executable package file 206 may be replicated and a copy of the source executable package file 212 may be modified using the semantic annotation service 202. In some cases a source executable package file 206 may be published by a third-party. Using the technology described herein, a third-party executable package file may be marked up with semantic annotations that enable other entities to evaluate the execution behavior, and in some cases, modify the execution behavior of the third-party executable package file.

The executable package file 212 may include components obtained from the source executable package file 206 that include a main class 208 (also called a main method) and one or more class files 210. The main class 208 may define an entry point of execution of a program. For example, the main class 208 may be the first class called when the executable package file 212 is loaded for execution. The class files 210 may contain intermediate language code (e.g., bytecode) that can be executed via a software interpreter 204 (e.g., a JVM) or can be converted to compiled code at runtime. The class files 210 may contain program components (e.g., classes, methods, variables, parameters, etc.) that are called by the main class 208 during execution and provide the functionality of the program.

The semantic annotation service 202 may be configured to declare a pre-main class 214 (also called a pre-main method) for an executable package file 212. The pre-main class 214 may include instructions for inserting semantic annotations into one or more class files 210 included in the executable package file 212 at the time the pre-main class 214 is executed. The semantic annotation service 202 may obtain the semantic annotations from a declarative document 216 that includes the semantic annotations and mappings that map the semantic annotations to program components included in the class files 210. The mappings may be included in the instructions contained in the pre-main class 214 that insert the semantic annotations in the class files 210. Accordingly, executing instructions in the pre-main class 214 may map a semantic annotation to a particular programming component in a class file 210 and insert the semantic annotation into the intermediate language code of the class file 210 relative to the program component declaration.

For example, an instruction in the pre-main class 214 may specify that a semantic annotation be inserted into a class file 210 during package execution or interpretation so that the semantic annotation may be placed in proximity to a program component declaration as specified by a respective programming language (e.g., JAVA, C#, etc.). In one example, the instructions included in the pre-main class 214 may instruct an intermediate operation code editor (e.g., Javassist or MSIL Editor) to insert semantic annotations into the intermediate operation code of the class files 210.

The pre-main class 214 may be executed prior to executing the main class 208 for the executable package file 212, thereby updating the class files 210 included in the executable package file 212 with the semantic annotations prior to handing control of the program to the main class 208. For example, when an executable package file 212 is loaded into a software interpreter 204 or loaded by an operating system, the pre-main class 214 may be executed prior to executing the main class 208. In doing so, the pre-main class 214 may serve as a new entry point of execution for the program. In one example, a manifest file (not shown) included in the executable package file 212 that specifies the entry point for the program may be updated to set the entry point to the pre-main class 214.

Having created the executable package file 212 that includes the pre-main class 214 and the instructions that embed the semantic annotations into the class files 210 using the semantic annotation service 202, the executable package file 212 may be loaded by a software interpreter 204 or loaded by an operating system for execution. As part of loading the executable package file 212 (e.g., during a class load phase), the pre-main class 214 that includes the instructions that embed the semantic annotations into the class files 210 may be executed. During execution of the pre-main class 214, an instruction may instruct an intermediate operation code editor to insert a semantic annotation associated with a particular program component into a class file 210 relative to the program component. After the instructions included in the pre-main class 214 have been executed, the one or more class files 210 included in the executable package file 212 may be annotated with the semantic annotations. Sometime thereafter, execution control may be passed to the main class 208 and execution of the program may begin.

During execution of the program, a semantic annotation associated with a program component may be evaluated and semantic context for the program component may be obtained via the semantic annotation. More specifically, in the event that a program component that includes a semantic annotation is called during execution of a program, the semantic annotation associated with the program component may be evaluated and a URI or a RDF triple included in the semantic annotation may be referenced in order to obtain semantic context for the program component from ontological data 220. In one example, evaluating a semantic annotation that includes a URI or RDF triple may cause a query to be generated that retrieves semantic context from ontological data 220. The query may comprise a semantic query language, such as the SPARQL Query Language.

Semantic context obtained via a semantic annotation may be used to examine, and in some cases modify, the execution behavior of the program. For example, the semantic context provided by the ontological data 220 may be used to evaluate execution behavior of the program at runtime, as well as to modify the execution behavior of the program at runtime using reflection. In evaluating execution behavior, semantic context may, for example, be used to: identify build dependency issues and runtime performance issues; tune or modify various program properties; or create customized build reports and dependency graphs. In modifying execution behavior at runtime using reflection, semantic context may, for example, be used to diagnose and correct: program exceptions, network issues, security issues, or even add additional functionality to a program by plugging in modules that exist outside of the programs operation code.

As one example use case, open source projects may depend on various programs, some of which may be third-party programs. The programs included in the open source project may be annotated with semantic annotations as described above. In loading and executing the programs, execution behavior for the programs may be evaluated using semantic context obtained from ontological data 220 referenced by the semantic annotations. For example, the semantic context provided by the ontological data 220 may be used to identify build dependency issues and runtime performance issues; tune or modify various program properties; or create customized build reports and dependency graphs. The programs included in the open source project that are capable of using reflection may, for example, identify a program component (e.g., method) associated with an exception and a semantic annotation associated with the program component, and then obtain semantic context from ontological data 220 referenced by the semantic annotation. The semantic context may link to a module that can be used to diagnose the exception and correct the exception. As will be appreciated, the technology disclosed herein may be applied to other use cases in addition to those described above.

FIG. 3 illustrates components of an example computing service environment 300 in which the present technology may be executed. The computing service environment 300 may include a number of servers 304, 306, 308, 310 configured to host various services. In one example, the computing service environment 300 may include computing resources for executing computing instances on the servers 304, 306, 308, 310, where a computing instance may be an instance of a virtual appliance (e.g., virtual machine) that shares computing resources of a server 304, 306, 308, 310 with other computing instances hosted by the server 304, 306, 308, 310. Services, programs, modules and the like may be hosted using computing instances hosted by the servers 304, 306, 308, 310, as described in more detail in relation to FIG. 4.

As illustrated, a server 304 may include a semantic annotation service 312 configured to annotate the operation code of an executable package file 302 with semantic annotations. For example, the semantic annotation service 312 may be used to insert one or more semantic annotations into the operation code (e.g., intermediate code) of one or more class files included in an executable package file 302. In some examples, an executable package file 302 may be replicated and a copy of the executable package file may be modified to include semantic annotations. A declarative document 326 may be utilized by the semantic annotation service 312 to map a semantic annotation to a program component (e.g., class, method, variable, parameter, etc.) included in a class file. The declarative document 326 may include mappings that map semantic annotations to program components included in the class files of an executable package file 302. For example, the declarative document 326 may specify that a particular class, method, variable, or parameter is associated with a specified semantic annotation.

In one example, the semantic annotation service 312 may be configured to reference a declarative document 326 associated with an executable package file 302 to identify program components associated with semantic annotations. Class files included in the executable package file 302 may be analyzed to determine whether a class file includes any of the program components identified in the declarative document 326 (or vice versa). In the case that a program component is identified in a class file, a semantic annotation associated with the program component may be inserted into the class file relative to the program component (i.e., relative to a declaration for the program component).

In another example, the semantic annotation service 312 may be configured to create a pre-main class for an executable package file 302 that includes instructions for an intermediate operation code editor 320 to annotate one or more class files included in the executable package file 302 with one or more semantic annotations. A declarative document 326 associated with the executable package file 302 may be referenced to identify program components included in the executable package file 302 that are associated with semantic annotations. For program components identified as being associated with semantic annotations, instructions may be added to the pre-main class that insert the semantic annotations into the class files that contain the program components. For example, the pre-main class may include a first instruction to annotate a specified class with a specified semantic annotation, and a second instruction to annotate a specified method with a specified semantic annotation, and so forth.

An instruction may include a location of a program component in a class file. For example, a class file may be analyzed to determine a location of a program component in the class file and the location of the program component may be included in an instruction that inserts a semantic annotation into the class file relative to the location of the program component. An instruction included in a pre-main class may instruct an intermediate operation code editor 320 to insert a semantic annotation in a class file at a specified location. In one example, instructions included in the pre-main class may comprise a domain specific language (i.e., a specialized language).

Instructions included in a pre-main class may be executed at the time that an executable package file 302 is loaded by a software interpreter 324. The pre-main class may be the entry point for a program 318. As such, the instructions included in the executable package file 302 may be executed prior to loading any of the program's class files, resulting in annotating the class files with semantic annotations prior to the class files being loaded by the software interpreter 324. Accordingly, when execution control is passed to the program's main class and the program's class files have been loaded, the class files will include the semantic annotations.

A server 308 may host a semantic context service 314 configured to manage storage of ontological data 316. For example, the semantic context service 314 may provide an interface to ontological data 316 that enables entities to add, delete, and update ontological data 316 associated with program components included in executable package files 302. Alternatively, the ontological data 316 may be maintained externally and may be accessible to programs 318 executing in the computing service environment 300. The ontological data 316 may include a plurality of ontologies related to a semantic concept or semantic concepts associated with classes, methods, variables, parameters, or other program components included in an executable package file 302. The ontological data 316 may be constructed using a Resource Description Framework (RDF) format and may be retrieved using a query generated by a program 318 in response to evaluating a semantic annotation. The ontological data 316 may be shareable among multiple entities, and the ontological data 316 may be synchronized between entities to reflect modifications to the ontological data 316.

Semantic annotations embedded in class files may include semantic URIs that references ontological data 316, or alternatively may include RDF statements about a program component. In one example, RDF statements may be made in the form of subject-predicate-object expressions. These expressions may be known as RDF triples. The subject denotes the resource, and the predicate denotes traits or aspects of the resource and expresses a relationship between the subject and the object. RDF may be used to ontologize program components into semantic concepts, such as, but not limited to: services, components, events, states, exceptions, artifacts, and dependencies.

In one example, RDF may be associated with its own query language, referred to as SPARQL Query Language. SPARQL may support a SELECT statement to return tuples, as well as a CONSTRUCT statement to return triples, which may be usable as a semantic resource. In addition, SPARQL may operate using hypertext transfer protocol (HTTP).

The various processes and/or other functionality contained within the computing service environment 300 may be executed on one or more processors that are in communication with one or more memory modules. The computing service environment 300 may include a number of servers that are arranged, for example, in one or more server banks or computer banks or other arrangements. The servers may support the computing service environment 300 using hypervisors, virtual machine monitors (VMMs) and other virtualization software.

The computing service environment 300 may include a number of data stores that manage ontological data 316, executable package files 312, declarative documents 326, and other data. The term "data store" may refer to any device or combination of devices capable of storing, accessing, organizing and/or retrieving data, which may include any combination and number of data servers, relational databases, object oriented databases, cluster storage systems, data storage devices, data warehouses, and data storage configurations in any centralized, distributed, or clustered environment. The storage system components of a data store may include storage systems such as a SAN (Storage Area Network), cloud storage network, volatile or non-volatile RAM, optical media, or hard-drive type media. A data store may be representative of a plurality of data stores as can be appreciated.

API calls, procedure calls or other network commands that may be made in relation to the services included in the computing service environment 300 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The servers 304, 306, 308, 310 may be in network communication via one or more networks 322. A network 322 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 3A:
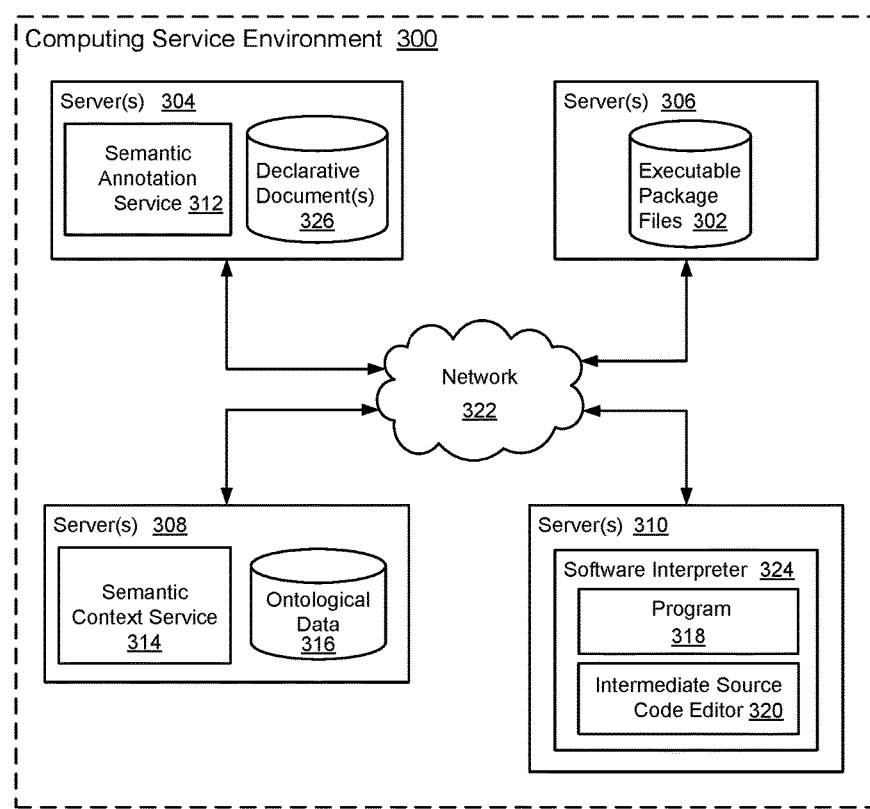
FIG. 3a illustrates a system for embedding semantic annotations into operation code according to an example of the present technology.
Figure 3B:
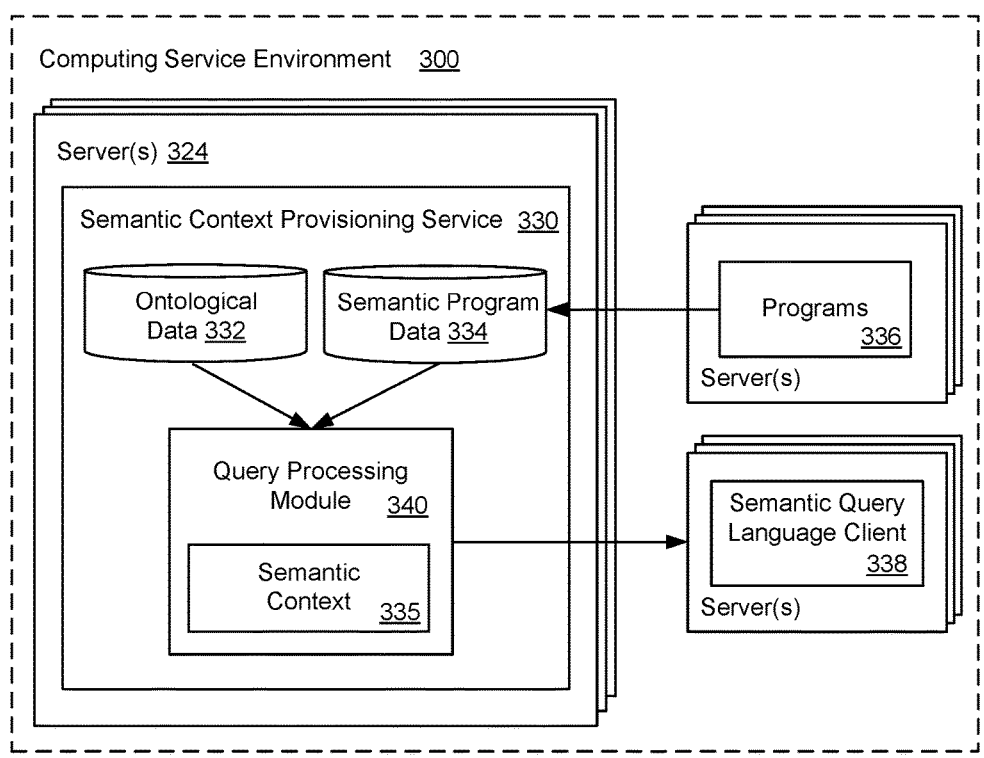
FIG. 3b illustrates a system and related operations for providing semantic context based on ontological data and semantic program data according to an example of the present technology.

FIG. 3b illustrates an exemplary system and related operations for providing semantic context 335 for programs 336 executing in a computing service environment 300. The semantic context 335 may be formed from ontological data 332 and semantic program data 334 associated with program elements included in the program 336. The semantic program data 334 may be emitted by programs 336 that are annotated with semantic annotations (e.g., RDF triples). During execution of the programs 336, the semantic annotations may be evaluated and semantic program data 334 may be sent to a semantic context provisioning service 330. The semantic context provisioning service 330 may operate on a server 324 in the computing service environment 300. The semantic context provisioning service 330 may utilize a paradigm to combine the ontological data 332 and the semantic data 334 to produce the semantic context 335.

In one example, the semantic context provisioning service 330 may manage storage of the ontological data 332 and the semantic data 334. In one example, the semantic data 334 may be stored in a semantic data store, such as a time series data store as described in relation to FIG. 3c. The ontological data 332 and the semantic program data 334 may be related to a semantic concept (or concepts). The ontological data 332 and the semantic program data 334 may be in RDF format. In addition, the semantic context provisioning service 330 may manage relational data models, Extensible Markup Language (XML) schemas, interface protocols, etc. associated with the storage of the ontological data 332 and the semantic program data 334.

In one example, a query processing module 340 may receive a request to perform a federated query against the ontological data 332 and the semantic program data 334. The request may be received from a semantic query language client 338 (e.g., SPARQL client) executing on a server. The query processing module 330 may perform the federated query (e.g., via SPARQL) to retrieve a portion of the ontological data 332 and the semantic program data 334. The federated query may be performed against multiple data sets in the ontological data 332 and the semantic program data 334. The query processing module 340 may produce semantic context 335 in response to the federated query. The semantic context 335 may provide meaning or an explanation for the semantic program data 334 in view of the ontological data 332.

As a non-limiting example, the semantic program data 334 may include log files from a program 336 executing on a server in the computing service environment 300. The semantic program data 334 may be combined with ontological data 332 that describes a method executed by the program 336. Through federated querying, the ontological data 332 and the semantic program data 334 may be combined to produce semantic context 334 for the method. The semantic context 335 may provide possible explanations for execution behavior or runtime errors.

Figure 3C:
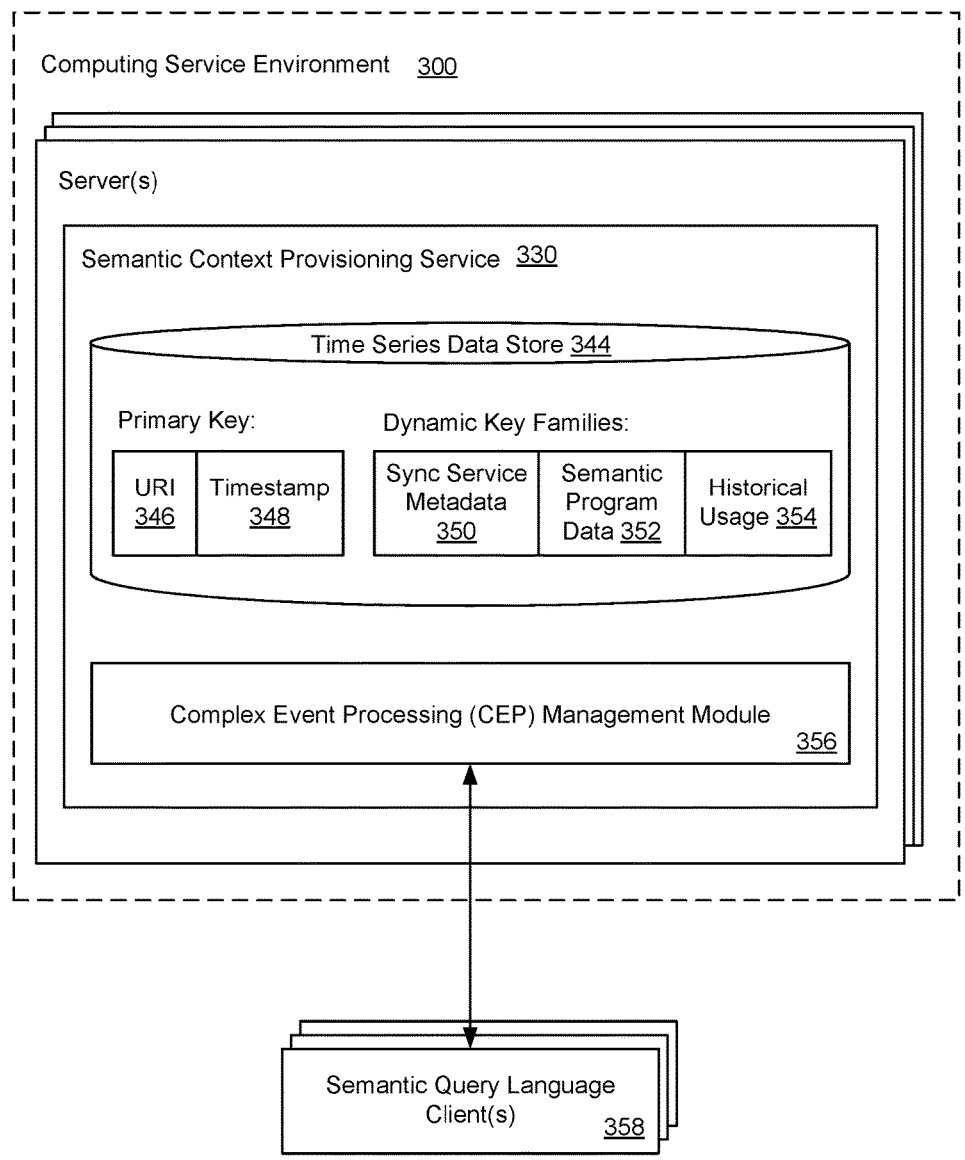
FIG. 3c illustrates a time series data store that includes semantic program data according to an example of the present technology.

FIG. 3c illustrates an example of a time series data store 344 that includes semantic program data 352. The time series data store 344 may be associated with a semantic context provisioning service 330 as described above. The time series data store 344 may be a non-relational distributed data store. The time series data store 344 may provide an ability to track an evolution of an observable phenomenon (e.g., program output), as well as a community of interest's activities with regard to the phenomenon. In other words, the time series data store 344 may provide a history of the shared knowledge to semantic query language clients 358 that query the time series data store 344.

In one example, the time series data store 344 may include a primary key (e.g., composite row key) and dynamic key families (e.g., three column families). The primary key may include a uniform resource identifier (URI) 346 associated with ontological data and a timestamp 348. A first family may include metadata 350 associated with a synchronization service that executes in the computing service environment 300. The first family may record agent or 'watcher' metadata that is provided by the synchronization service. A second family may include semantic program data 352 that is partitioned based on a semantic concept. A format of the semantic program data 352 may be tuples, triples, maps, etc. The semantic program data 352 may be received from programs executing in the computing service environment 300, or outside of the computing service environment 300. The time series data store 344 may be appendable, such that different entities may add their semantic program data 352 at various times, and the semantic program data 352 may be findable based on a URI 346 associated with ontological data. In other words, the semantic program data may be shared among the entities. A third family may be metadata that tracks a historical usage 354 of the ontological data. The third family may record execution times, parameters, etc. for a program, as well as historical exploitation of ontological data by the program.

In one example, the semantic context provisioning service 330 may include a complex event processing (CEP) management module 356 that can be queried by semantic query language clients 358. The CEP management module 356 may provide a sliding time window over time series data, such as the semantic program data 352. For example, a time window may be created that defines a certain period of time (e.g., 6 months), and the complex relationship of events occurring within that time window may be determined via the CEP management module 356. In addition, the CEP management module 356 may organize events into relations. In this example, the relations may indicate certain occurrences within that time window.

FIGS. 3a-b illustrate certain services may be discussed in connection with this technology. In one example configuration, a service may include one or more processes executing on a server or other computer hardware. Such services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with the service and make requests and receive output from the services. While FIGS. 3a-b illustrate example systems that may implement the techniques above, many other similar or different environments are possible. The example environments discussed and illustrated above are merely representative and not limiting.

Figure 4:
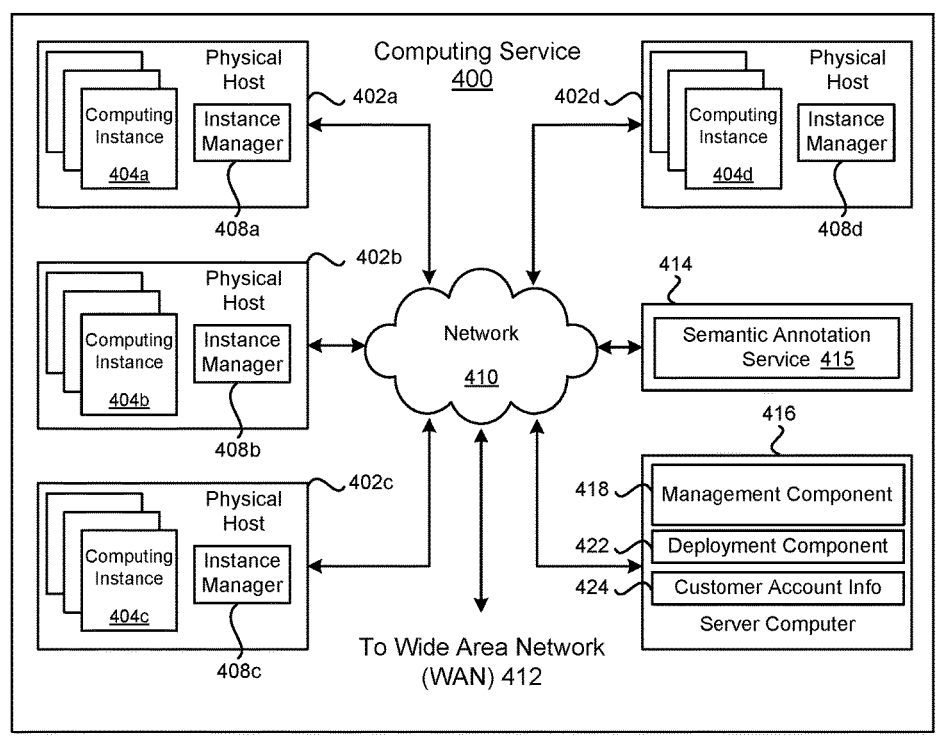
FIG. 4 is a block diagram that illustrates an example computing service environment that includes a semantic annotation service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of servers 402a-d. While four servers are shown, any number may be used, and large data centers may include thousands of servers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the servers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

In one example, a server 414 may execute a semantic annotation service 415 configured to annotate operation code with semantic annotations as described earlier. In another example, the semantic annotation service 415 may be hosted on one or more computing instances 404a-d.

A server 416 may be reserved to execute software components 418, 422, 424 that manage the operation of the computing service 400 and the computing instances 404a-d. A customer may access a management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the servers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
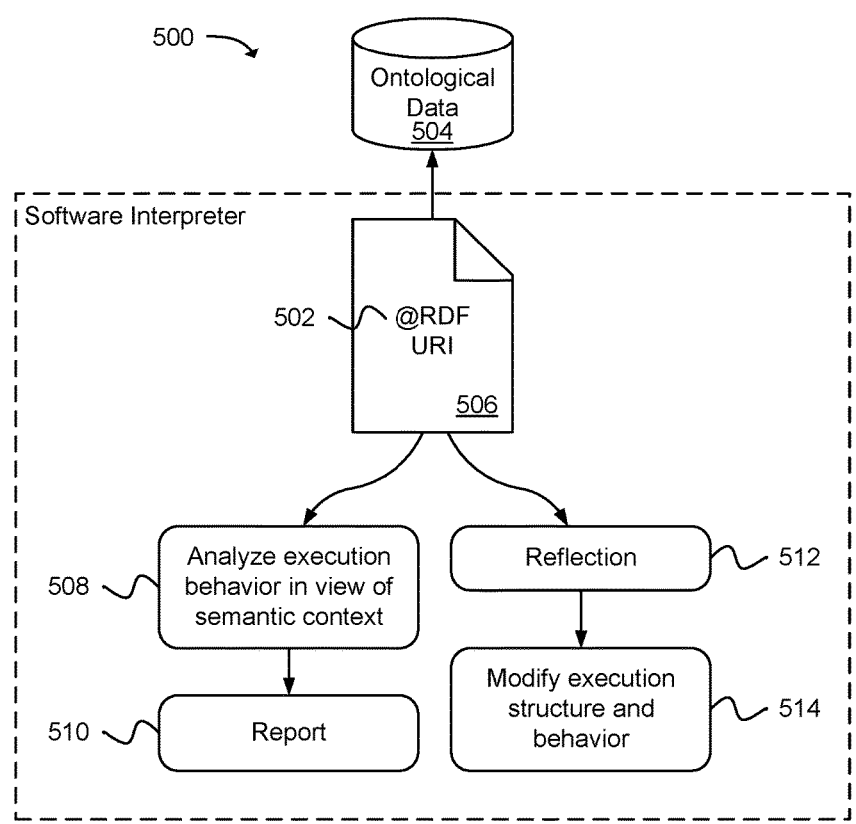
FIG. 5 is a diagram illustrating an example method for retrieving semantic context from ontological data referenced by a semantic annotation and using the semantic context to analyze execution behavior in relation to a program component included in operation code.

Moving now to FIG. 5, a diagram illustrates an example method 500 for processing a semantic annotation 502 embedded in operation code 506 during execution of the program to obtain semantic context for a program component (e.g., class, method, variable, parameter, etc.) associated with the semantic annotation 502. Illustratively, a semantic annotation 502 may be processed in combination with the processing of a program component associated with the semantic annotation 502. As an example, an exception handler may be annotated with a semantic annotation. In the case that the exception handler is invoked, a determination may be made that a semantic annotation is associated with the exception handler and the semantic annotation may be processed.

In one example, processing of a semantic annotation 502 may cause a query to be generated that obtains semantic context from ontological data 504 referenced by a URI included in the semantic annotation 502. Semantic context provided by the ontological data 504 may be used to analyze the execution behavior of the program, as in block 508. Results of the analysis of the execution behavior may be reported (e.g., to an administrator, developer, service provider customer, etc.), as in block 510. For example, semantic context may be used to add context to system alerts, reports, logs, stack traces, and the like. As an example, context may be added to a notification generated by an exception handler that suggests a course of action obtained from a knowledge base.

In another example, semantic context obtained from ontological data 504 may be used to modify the execution behavior of a program. The program may be configured to use reflection, such that the program may be configured with the ability to examine, introspect, and modify the structure and behavior of the program using semantic context obtained from ontological data 504 during execution. Thus, processing of a semantic annotation 502 may cause a query to be generated that obtains semantic context from ontological data 504, and using reflection as in block 512, the semantic context may be used to modify the execution structure and behavior of the program, as in block 514. As an example, invoking an exception handler may cause semantic context to be retrieved from ontological data 504 and the semantic context may specify the significance of the exception and specify a course of action, such as invoking a class or method that handles the exception.

Figure 6:
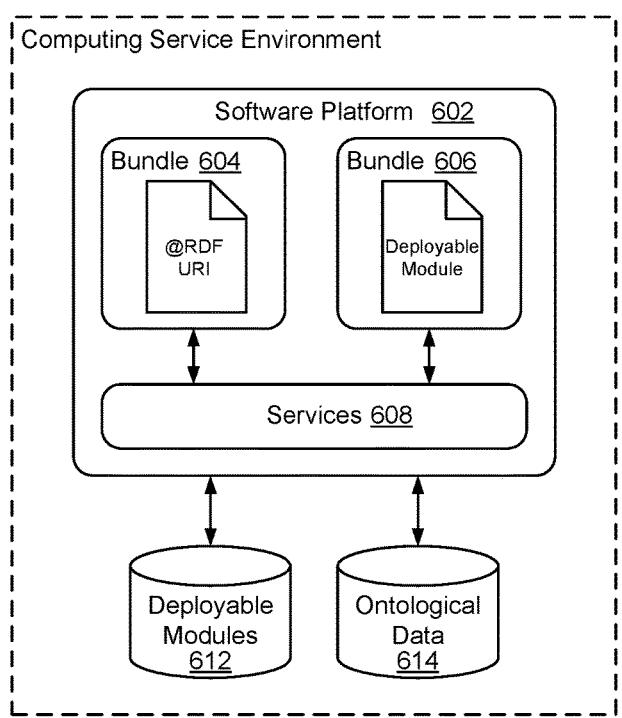
FIG. 6 is a block diagram that illustrates an example system for executing executable package files containing semantic annotations in a software container.

FIG. 6 is a block diagram illustrating an example system for modifying the execution structure and behavior of a program using semantic context obtained from ontological data 614 referenced by a semantic annotation. In particular, illustrated is a system for adding additional functionality to a program using deployable modules 612. A program that includes embedded semantic annotations may be packaged in a bundle 604, which may be executed using services 608 provided by a software platform 602. During execution of the program, semantic context obtained via a semantic annotation may specify a deployable module 612, which may be packaged in a bundle 606 and loaded onto the software platform 602.

In one example, a software platform 602 may be based on an OSGi (Open Service Gateway Initiative) specification. OSGi is a JAVA framework for developing and deploying modular programs and libraries. Bundles 604, 606 may be deployed on the software platform 602 and can be started, stopped, updated, and uninstalled without requiring a reboot of the software platform 602. A bundle 604, 606 may be a tightly coupled, dynamically loadable collection of class files and configuration files that declare any external dependencies. A service registry (not shown) may allow bundles 604, 606 to detect the addition of, or removal of services 608 and adapt accordingly. The services 608 may be accessible via a services layer that connects bundles 604, 606 dynamically by offering a publish-find-bind model for JAVA interfaces.

Utilizing the software platform 602 provided by the OSGi framework, the execution behavior of a program executing as part of a bundle 604 can be modified when semantic context obtained from ontological data 614 referenced by a semantic annotation specifies the launch of a bundle 606 that includes a deployable module 612. For example, the program executing as part of a bundle 604 may be aware of a module executing as part of the bundle 606 that was launched and may reference the module to modify the program's execution behavior. As such, "hot-deployment" of modules may be performed using the software platform 602.

Figure 7:
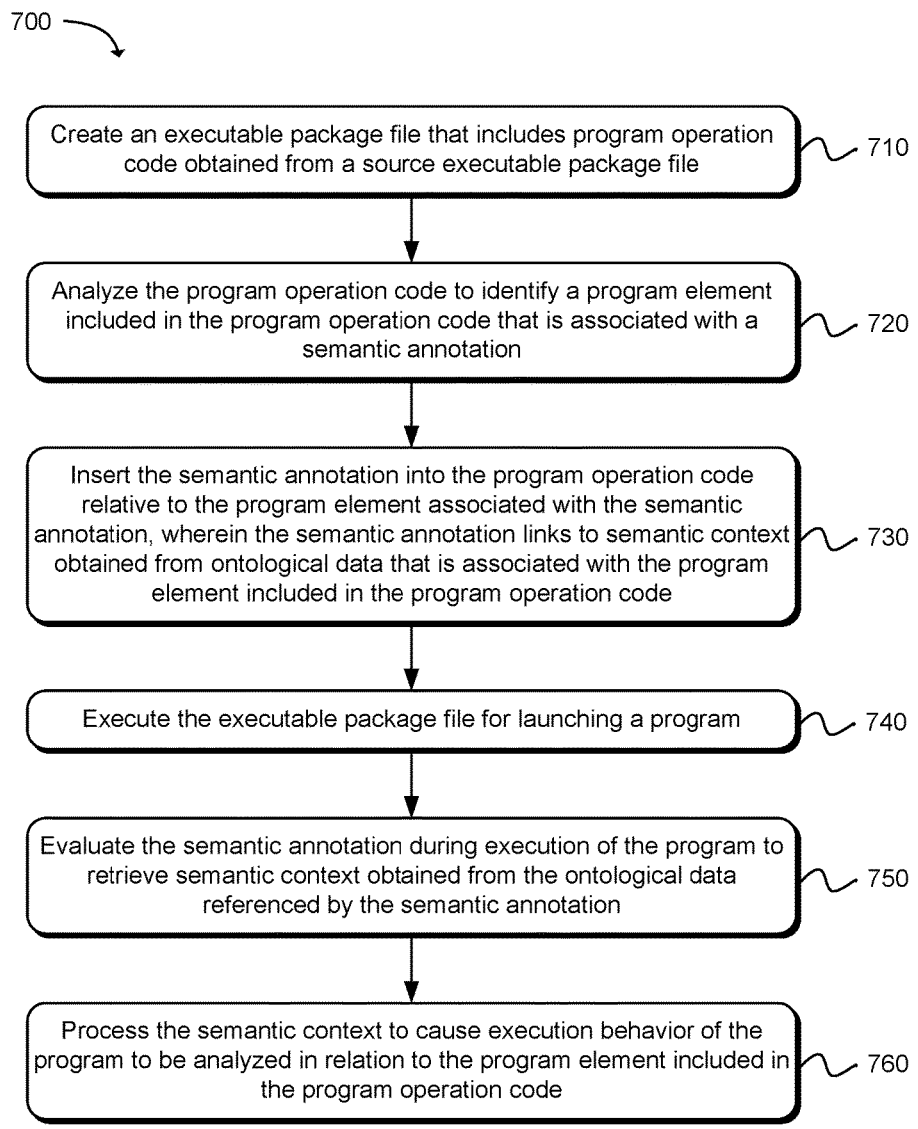
FIG. 7 is a flow diagram illustrating an example method for embedding a semantic annotation in operation code that enables semantic context to be retrieved from an ontology.

FIG. 7 is a flow diagram that illustrates an example method 700 for embedding a semantic annotation in operation code. As in block 710, an executable package file that includes operation code obtained from a source executable package file may be created. As in block 720, the operation code may be analyzed to identify a program element included in the operation code that may be associated with a semantic annotation. For example, a declarative document associated with the executable package file may be identified and a mapping may be obtained from the declarative document that maps the semantic annotation to the program element included in the operation code to enable insertion of the semantic annotation into the operation code relative to the program element associated with the semantic annotation.

As in block 730, the semantic annotation may be inserted into the operation code relative to the program element associated with the semantic annotation, where the semantic annotation links to semantic context obtained from ontological data that may be associated with the program element included in the operation code. For example, the semantic annotation may be inserted relative to at least one of: a class, a method, a variable, or a parameter included in the operation code that is associated with the semantic annotation.

As in block 740, the executable package file may be executed, thereby launching a program. As in block 750, the semantic annotation may be evaluated during execution of the program to retrieve semantic context obtained from the ontological data referenced by the semantic annotation.

As in block 760, the semantic context may be processed to cause execution behavior of the program to be analyzed in relation to the program element included in the operation code. Further, processing of the semantic context may result in modifying the execution behavior of the program using reflection. For example, a module identified by the semantic context may be deployed during execution of the program that modifies an execution flow of the program.

Figure 8:
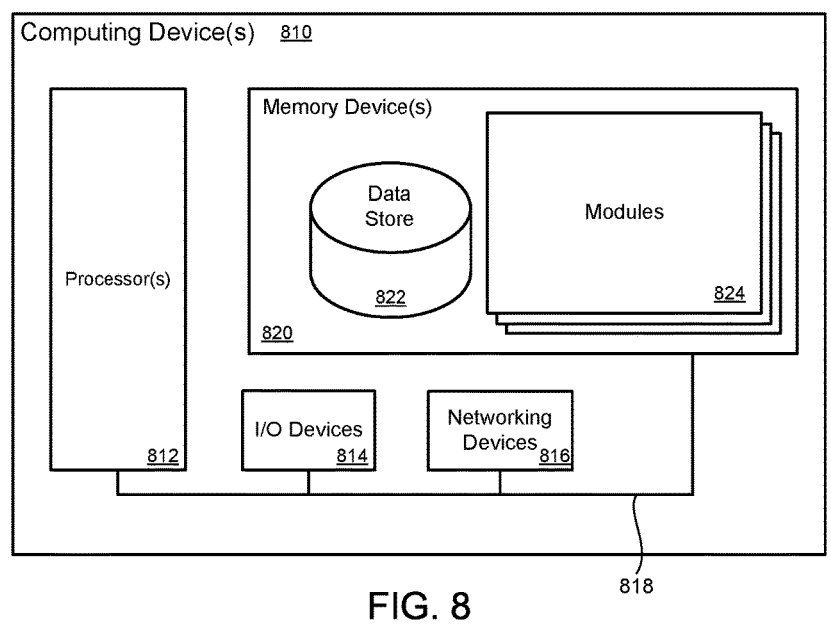
FIG. 8 is block diagram illustrating an example of a computing device that may be used to execute a method for embedding semantic annotations into operation code.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the services described earlier, including the semantic annotation service. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or operation code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
identifying an executable package file that includes operation code obtained from a source executable package file;
analyzing the operation code to identify a program element included in the operation code that is associated with a semantic annotation;
inserting the semantic annotation into the operation code for the program element associated with the semantic annotation, wherein the semantic annotation links to semantic context obtained from ontological data that is associated with the program element included in the operation code;
executing the executable package file;
evaluating the semantic annotation during execution in order to retrieve semantic context obtained from the ontological data referenced by the semantic annotation; and
processing of the semantic context to cause execution behavior to be analyzed in relation to the program element included in the operation code.

2. The method as in claim 1, further comprising:
identifying a declarative document that is associated with the executable package file; and
obtaining from the declarative document a mapping that maps the semantic annotation to the program element included in the operation code to enable insertion of the semantic annotation into the operation code for the program element associated with the semantic annotation.

3. The method as in claim 1, wherein inserting the semantic annotation into the operation code further comprises associating the semantic annotation with at least one of: a class, a method, a variable, or a parameter included in the operation code that is associated with the semantic annotation.

4. The method as in claim 1, wherein the operation code further comprises an executable intermediate operation code that is executable by a virtual machine and a semantic annotation.

5. The method as in claim 1, wherein inserting the semantic annotation into the operation code further comprises inserting the semantic annotation into intermediate operation code using an intermediate operation code editor.

6. The method as in claim 1, wherein processing of the semantic annotation further comprises performing a query against the ontological data using a semantic query language that includes a SPARQL Query Language.

7. The method as in claim 1, wherein processing of the semantic context further comprises modifying the execution behavior of a program using reflection.

8. The method as in claim 7, further comprising deploying a module identified by the semantic context during execution of a program that modifies an execution flow of the program.

9. The method as in claim 1, wherein the ontological data which provides the semantic context is shareable among multiple entities, and the ontological data is synchronized between the entities to reflect modifications to the ontological data.

10. The method as in claim 1, wherein the source executable package file is a third-party executable package file.

11. The method as in claim 1, wherein the semantic annotation includes one or more semantic URIs (Uniform Resource Identifiers) that reference the ontological data associated with the program element included in the operation code.

12. The method as in claim 1, wherein the semantic annotation includes one or more Resource Description Framework (RDF) triples that reference the ontological data related to the program element included in the operation code.

13. The method as in claim 1, wherein the ontological data is constructed using a Resource Description Framework (RDF) format.

14. A system comprising:
at least one processor;
a memory device including instructions that, when executed by the at least one processor, cause the system to:
identify an executable package file that includes operation code obtained from a source executable package file;
identify a declarative document associated with the executable package file that maps a semantic annotation to program elements included in the operation code;
analyze the operation code to identify a program element included in the operation code that is associated with the semantic annotation;
insert the semantic annotation into the operation code for the program element associated with the semantic annotation, wherein the semantic annotation links to semantic context obtained from ontological data that is associated with the program element included in the operation code;
execute the executable package file;
evaluate the semantic annotation during execution in order to retrieve semantic context obtained from the ontological data referenced by the semantic annotation; and
process the semantic context to cause execution behavior to be analyzed in relation to the program element included in the operation code.

15. The system as in claim 14, wherein the memory device includes instructions that, when executed by the at least one processor, cause the system to update a manifest file included in the executable package file to set an entry point for execution of the executable package file to a pre-main class.

16. The system as in claim 14, wherein the memory device includes instructions that, when executed by the at least one processor, cause the system to modify a structure of the program using reflection and the semantic context obtained from an ontological data store.

17. The system as in claim 14, wherein the memory device includes instructions that, when executed by the at least one processor, cause the system to modify execution flow of a program based in part on processing of the semantic context in relation to the program element included in the operation code.

18. A non-transitory machine readable storage medium having instructions embodied thereon, the instructions when executed by one or more processors:
    identify an executable package file that includes operation code obtained from a source executable package file;
    analyze the operation code to identify a program element included in the operation code that is associated with a semantic annotation;
    insert the semantic annotation into the operation code for the program element associated with the semantic annotation, wherein the semantic annotation links to semantic context obtained from ontological data that is associated with the program element included in the operation code;
    execute the executable package file;
    evaluate the semantic annotation during execution in order to retrieve semantic context obtained from the ontological data referenced by the semantic annotation; and
    process the semantic context to cause execution behavior to be analyzed in relation to the program element included in the operation code and modifying the execution behavior using reflection.

19. The non-transitory machine readable storage medium in claim 18, further comprising instructions that when executed by the one or more processors cause the one or more processors to identify a declarative document associated with the executable package file that maps the semantic annotation to the program element included in the operation code.

20. The non-transitory machine readable storage medium in claim 19, further comprising instructions that when executed by the one or more processors cause the one or more processors to identify the program element in the operation code mapped to the semantic annotation as indicated by the declarative document.

* * * * *